United States Patent
Ikeda et al.

(10) Patent No.: US 12,061,019 B2
(45) Date of Patent: Aug. 13, 2024

(54) AIR-CONDITIONING APPARATUS

(71) Applicant: Mitsubishi Electric Corporation, Tokyo (JP)

(72) Inventors: Soshi Ikeda, Tokyo (JP); Jun Nishio, Tokyo (JP); Naofumi Takenaka, Tokyo (JP); Katsuhiro Ishimura, Tokyo (JP); Yuji Motomura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 276 days.

(21) Appl. No.: 17/775,313

(22) PCT Filed: Jan. 8, 2020

(86) PCT No.: PCT/JP2020/000296
§ 371 (c)(1),
(2) Date: May 9, 2022

(87) PCT Pub. No.: WO2021/140589
PCT Pub. Date: Jul. 15, 2021

(65) Prior Publication Data
US 2022/0373233 A1     Nov. 24, 2022

(51) Int. Cl.
*F25B 13/00*         (2006.01)
*F25B 9/00*          (2006.01)
(Continued)

(52) U.S. Cl.
CPC ............. *F25B 13/00* (2013.01); *F25B 9/006* (2013.01); *F25B 41/26* (2021.01); *F25B 41/40* (2021.01);
(Continued)

(58) Field of Classification Search
CPC .......... F25B 13/00; F25B 41/26; F25B 41/40; F25B 41/20; F25B 7/00; F25B 9/006;
(Continued)

(56) References Cited

U.S. PATENT DOCUMENTS

| 5,784,893 A | 7/1998 | Furuhama et al. |
| 2011/0037017 A1 | 2/2011 | Leck |

(Continued)

FOREIGN PATENT DOCUMENTS

| JP | 5-256478 A | 10/1993 |
| JP | 7-269964 A | 10/1995 |

(Continued)

OTHER PUBLICATIONS

International Search Report and Written Opinion mailed on Mar. 17, 2020, received for PCT Application PCT/JP2020/000296, Filed on Jan. 8, 2020, 12 pages including English Translation.

*Primary Examiner* — Len Tran
*Assistant Examiner* — Kamran Tavakoldavani
(74) *Attorney, Agent, or Firm* — XSENSUS LLP

(57) ABSTRACT

An air-conditioning apparatus includes: a heat source-side system having an intermediate heat exchanger that causes heat exchange to be performed between a heat source-side heat medium and a use-side heat medium, causes the heat source-side heat medium to receive or transfer heat, and causes the use-side heat medium to undergo a phase change; and a use-side cycle circuit formed of pipes connecting, to one another, the intermediate heat exchanger, a pump that sucks and delivers the use-side heat medium in a liquid state, a use-side heat exchanger that heats or cools air in an air-conditioning target space due to heat exchange causing a change in phase of the use-side heat medium, and a pressure-reducing device that reduces a pressure of the use-side heat medium that passes through the use-side heat exchanger, the use-side cycle circuit causing the use-side heat medium to circulate through the use-side cycle circuit.

13 Claims, 6 Drawing Sheets

(51) Int. Cl.
*F25B 41/26* (2021.01)
*F25B 41/40* (2021.01)

(52) U.S. Cl.
CPC . *F25B 2313/02791* (2013.01); *F25B 2400/12* (2013.01)

(58) Field of Classification Search
CPC ............ F25B 21/02; F25B 2313/02791; F25B 2313/0292; F25B 2400/12; F25B 2400/16; F25B 2700/2103; F25B 41/22; F25B 2600/2501; F25B 2600/2507; F25B 2600/2519; F24D 19/1039
See application file for complete search history.

(56) References Cited

U.S. PATENT DOCUMENTS

| | | | |
|---|---|---|---|
| 2011/0197604 | A1 | 8/2011 | Minor et al. |
| 2018/0259219 | A1* | 9/2018 | Motomura ............... F24F 11/89 |
| 2020/0208882 | A1 | 7/2020 | Ota et al. |

FOREIGN PATENT DOCUMENTS

| | | | |
|---|---|---|---|
| JP | 10-306952 | A | 11/1998 |
| JP | 2005-241074 | A | 9/2005 |
| JP | 2008-209075 | A | 9/2008 |
| JP | 2008-215773 | A | 9/2008 |
| JP | 4225304 | B2 | 2/2009 |
| JP | 2014-139078 | A | 7/2014 |
| JP | 6545338 | B1 | 7/2019 |

* cited by examiner

— REFRIGERANT FLOW DURING COOLING OPERATION
---- REFRIGERANT FLOW DURING HEATING OPERATION

→ REFRIGERANT FLOW DURING COOLING OPERATION
⇢ REFRIGERANT FLOW DURING HEATING OPERATION

→ REFRIGERANT FLOW DURING COOLING OPERATION
--→ REFRIGERANT FLOW DURING HEATING OPERATION

→ REFRIGERANT FLOW DURING COOLING OPERATION
--→ REFRIGERANT FLOW DURING HEATING OPERATION

AIR-CONDITIONING APPARATUS

CROSS-REFERENCE TO RELATED APPLICATION

The present application is based on PCT filing PCT/JP2020/000296, filed Jan. 8, 2020, the entire contents of which is incorporated herein by reference.

TECHNICAL FIELD

The present disclosure relates to an air-conditioning apparatus. In particular, the present disclosure relates to an air-conditioning apparatus in which a heat medium that undergoes a phase change is transported by a pump.

BACKGROUND ART

As air-conditioning apparatuses for making the inside of a room comfortable, there have been known air-conditioning apparatuses that have a circuit forming a primary-side cycle (hereinafter, the circuit is referred to as a primary-side cycle) and a circuit forming a secondary-side cycle (hereinafter, the circuit is referred to as a secondary-side cycle) and in which refrigerant that undergoes a phase change is used for the circuits. Here, an air-conditioning apparatus having a primary-side cycle formed of a circuit of a vapor compression cycle and a secondary-side cycle formed of a circuit of a liquid pump cycle (for example, refer to Patent Literature 1) is known. The air-conditioning apparatus removes indoor heat at the secondary-side cycle and thus cools air. A heat exchanger that exchanges heat between the refrigerants in the cycles causes the refrigerant in the primary-side cycle to receive heat from the refrigerant in the secondary-side cycle. In the primary-side cycle, the heat of the refrigerant in the primary-side cycle is then transferred outside the room, and air-conditioning for cooling such an air-conditioning target space is thereby achieved.

CITATION LIST

Patent Literature

Patent Literature 1: Japanese Unexamined Patent Application Publication No. 5-256478

SUMMARY OF INVENTION

Technical Problem

However, although the air-conditioning apparatus having the configuration described in Patent Literature 1 can perform a cooling operation for removing heat in the room, which is an air-conditioning target space, to cool the air in the room, the air-conditioning apparatus cannot perform a heating operation for transferring heat into the room to heat the air in the room. Thus, the refrigerant in the primary-side cycle cannot heat the refrigerant in the secondary-side cycle. In addition, even if the refrigerant in the primary-side cycle can heat the refrigerant in the secondary-side cycle, gas flows into a pump included in the secondary-side cycle due to the configuration of the secondary-side cycle. Such inflow of gas into the pump may cause, for example, unstable drive and a breakdown. Consequently, such an air-conditioning apparatus having the configuration described in, for example, Patent Literature 1 has a problem of the impossibility of performing the heating operation.

Thus, to solve such an above-described problem, an object of the present disclosure is to obtain an air-conditioning apparatus capable of performing stable cooling and heating operations.

Solution to Problem

An air-conditioning apparatus of an embodiment of the present disclosure includes: a heat source-side system having an intermediate heat exchanger that exchanges heat between a heat source-side heat medium and a use-side heat medium differing from the heat source-side heat medium, causes the heat source-side heat medium to receive or transfer heat due to performing switching, and causes the use-side heat medium to undergo a phase change; and a use-side cycle circuit formed of pipes connecting, to one another, the intermediate heat exchanger, a pump that sucks and delivers the use-side heat medium in a liquid state, a use-side heat exchanger that heats or cools air in an air-conditioning target space due to heat exchange causing a change in phase of the use-side heat medium, and a pressure-reducing device that reduces a pressure of the use-side heat medium that passes through the use-side heat exchanger, the use-side cycle circuit causing the use-side heat medium to circulate through the use-side cycle circuit.

Advantageous Effects of Invention

The air-conditioning apparatus is capable of air-conditioning by driving the pump, by heating or cooling the use-side heat medium at the intermediate heat exchanger to cause phase change, and by cooling or heating, at the use-side heat exchanger, the air in the air-conditioning target space in an efficient manner. At this point, the pump is configured to suck and deliver the use-side heat medium in a liquid state, and it is thereby possible to suppress the use-side heat medium in a gaseous state from passing through the pump. Thus, the air-conditioning apparatus is capable of performing stable cooling and heating operations.

DESCRIPTION OF EMBODIMENTS

Figure 1:
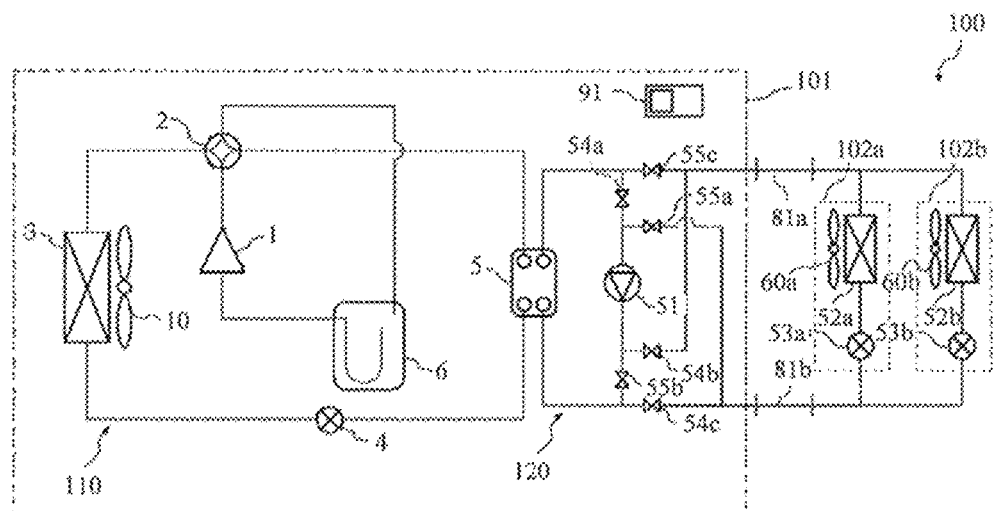
FIG. 1 schematically illustrates an example of the configuration of an air-conditioning apparatus according to Embodiment 1.

Hereinafter, air-conditioning apparatuses according to embodiments will be described with reference to, for example, the accompanying drawings. In the drawings, components denoted by the same references are the same or equivalent to one another, and the same applies throughout the entire description of the embodiments below. In the drawings, the relationships of the sizes of the components sometimes differ from the relationships of the sizes of actual ones. The forms of the components represented in the entire description are merely examples, and the forms of the components are not limited to the forms in the description. In particular, the combination of the components is not limited to only the combination in each embodiment, and an element described in one embodiment can be applied to another embodiment. In addition, the levels of, for example, pressure and temperature are not particularly determined in relation to absolute values. Such levels are relatively determined depending on, for example, the state and the operation of, for example, the apparatus. In addition, regarding plural devices of the same type that are distinguished from one another by added letters, such added letters are sometimes omitted when the devices are not particularly required to be distinguished from one another or identified.

Embodiment 1

[Air-Conditioning Apparatus]

FIG. 1 schematically illustrates an example of the configuration of an air-conditioning apparatus according to Embodiment 1. An air-conditioning apparatus 100 is configured by a forward pipe 81a and a return pipe 81b connecting, to one another, an outdoor unit 101 and plural indoor units 102 (an indoor unit 102a and an indoor unit 102b). The air-conditioning apparatus 100, in which the outdoor unit 101 and the plural indoor units 102 are connected to one another by the pipes, has a heat source-side cycle circuit on the primary side (hereinafter, referred to as a heat source-side cycle 110) for which a heat pump is used and through which a heat source-side heat medium is circulated. The heat source-side cycle 110 serves as a heat source-side system. The air-conditioning apparatus 100 further has a use-side cycle circuit on the use-side (hereinafter, referred to as a use-side cycle 120) for which a heat pump is used and through which a use-side heat medium is circulated. The heat source-side heat medium in the heat source-side cycle 110 is circulated only inside the outdoor unit 101. The use-side heat medium in the use-side cycle 120 is circulated through, in this order, the outdoor unit 101, the forward pipe 81a, the indoor units 102, and the return pipe 81b. Here, although FIG. 1 illustrates an example of the air-conditioning apparatus 100 having two indoor units 102a and 102b, the number of the indoor units 102 is not limited to two and may be one or may be three or more.

[Outdoor Unit]

The outdoor unit 101 is, for example, a device that is installed outside a room being an air-conditioning target space and that transfers the heat related to air-conditioning to the outside of the room or receives the heat related to air-conditioning from outside the room. The outdoor unit 101 is equipped with a compressor 1, a heat source-side flow-switching device 2, a heat source-side heat exchanger 3, an expansion device 4, an intermediate heat exchanger 5, and an accumulator 6 that are components of the heat source-side cycle 110. The outdoor unit 101 is further equipped with a heat source-side fan 10 that sends air to the heat source-side heat exchanger 3. In addition, the outdoor unit 101 is equipped with a pump 51, a cooling-dedicated first on-off valve 54a, a cooling-dedicated second on-off valve 54b, a cooling-dedicated third on-off valve 54c, a heating-dedicated first on-off valve 55a, a heating-dedicated second on-off valve 55b, and a heating-dedicated third on-off valve 55c that are components of the use-side cycle 120.

[Indoor Unit]

Each of the indoor units 102 is, for example, a device that is installed inside the room and that transfers the heat related to air-conditioning to the inside of the room or receives the heat related to air-conditioning from inside the room. The indoor unit 102 is equipped with a use-side heat exchanger 52 and a pressure-reducing device 53 that are devices of the use-side cycle 120. The indoor unit 102 is further equipped with a use-side fan 60. That is, the indoor unit 102a is equipped with a use-side heat exchanger 52a, a pressure-reducing device 53a, and a use-side fan 60a. The indoor unit 102b is equipped with a use-side heat exchanger 52b, a pressure-reducing device 53b, and a use-side fan 60b.

[Heat Source-Side Cycle]

The compressor 1 is, for example, a device formed of, for example, a capacity-controllable inverter compressor, and the device sucks and compresses the heat source-side heat medium at low-pressure into a high-pressure state and discharges the high-pressure heat source-side heat medium. The heat source-side flow-switching device 2 is, for example, a device that is formed of, for example, a four-way valve and that switches between the flow passage during the cooling operation and the flow passage during the heating operation to perform switching of the heat exchanger that functions as a condenser and an evaporator. In the heat source-side cycle 110 during the cooling operation, due to such switching performed of the heat source-side flow-switching device 2, the connection is made in the following order: the compressor 1, the heat source-side flow-switching device 2, the heat source-side heat exchanger 3, the expansion device 4, the intermediate heat exchanger 5, the heat source-side flow-switching device 2, the accumulator 6, and the compressor 1. The heat source-side heat exchanger 3 functions as a condenser, and the intermediate heat exchanger 5 functions as an evaporator. In addition, in the heat source-side cycle 110 during the heating operation, due to the switching performed by the heat source-side flow-switching device 2, the connection is made in the following order: the compressor 1, the heat source-side flow-switching device 2, the intermediate heat exchanger 5, the expansion device 4, the heat source-side heat exchanger 3, the heat source-side flow-switching device 2, the accumulator 6, and the compressor 1. The heat source-side heat exchanger 3 functions as an evaporator, and the intermediate heat exchanger 5 functions as a condenser. Although an example of applying a four-way valve to the heat source-side flow-switching device 2 is given here and in the following description, the four-way valve is not the only option, and a three-way valve or a device formed of combined two-way valves may be applied to the heat source-side flow-switching device 2.

The heat source-side heat exchanger 3 is a device that causes heat exchange to be performed between the air supplied from the heat source-side fan 10 and the heat source-side heat medium. The heat source-side heat exchanger 3 is formed of, for example, a fin-and-tube heat exchanger. Regarding the heat source-side heat exchanger 3, one end is connected to the heat source-side flow-switching device 2, and the other end is connected to the expansion device 4. The heat source-side heat exchanger 3, during the cooling operation, causes the heat source-side heat medium at high temperature to transfer heat to air at a temperature lower than the temperature of the high-temperature heat source-side heat medium and thus functions as a condenser. In addition, the heat source-side heat exchanger 3, during the heating operation, causes the heat source-side heat medium at low temperature to receive heat from air at a temperature higher than the temperature of the low-temperature heat source-side heat medium and thus functions as an evaporator. Although an example of applying a fin-and-tube heat exchanger to the heat source-side heat exchanger 3 is given here and in the following description, the fin-and-tube heat exchanger is not the only option, and a plate heat exchanger, for example, may be applied to the heat source-side heat exchanger 3.

The expansion device 4 is a device that reduces the pressure of the heat source-side heat medium. The expansion device 4 is formed of, for example, a device, such as an electronic expansion valve, whose opening degree can be variably controlled. Regarding the expansion device 4, one end is connected to the heat source-side heat exchanger 3, and the other end is connected to the intermediate heat exchanger 5. Although an example of applying an electronic expansion valve to the expansion device 4 is given here and in the following description, the electronic expansion valve is not the only option, and a device such as a capillary tube or a solenoid valve may be applied to the expansion device 4.

The intermediate heat exchanger 5 is a device that exchanges heat between the heat source-side heat medium circulating in the heat source-side cycle 110 and the use-side heat medium circulating in the use-side cycle 120. The intermediate heat exchanger 5 is formed of, for example, a plate heat exchanger. Regarding the intermediate heat exchanger 5, in the flow passage on the heat source-side cycle 110 side, one end is connected to the expansion device 4, and the other end is connected to the heat source-side flow-switching device 2. In addition, regarding the intermediate heat exchanger 5, in the flow passage on the use-side cycle 120 side, one end is connected to the return pipe 81b, and the other end is connected to the pump 51. The intermediate heat exchanger 5, during the cooling operation, functions as an evaporator. Thus, the heat source-side heat medium at low temperature receives heat from the use-side heat medium at a temperature higher than the temperature of the low-temperature heat source-side heat medium. In addition, the intermediate heat exchanger 5, during the heating operation, functions as a condenser. Thus, the heat source-side heat medium at high temperature transfers heat to the use-side heat medium at a temperature lower than the temperature of the high-temperature heat source-side heat medium. Although an example of applying a plate heat exchanger to the intermediate heat exchanger 5 is given here and in the following description, the plate heat exchanger is not the only option, and a double-pipe heat exchanger, for example, may be applied to the intermediate heat exchanger 5.

In the accumulator 6, there accumulates a surplus heat source-side heat medium generated in the heat source-side cycle 110 due to the difference between the heating operation and the cooling operation or a surplus heat source-side heat medium generated due to a transient change of operation. Regarding the accumulator 6, one end is connected to the heat source-side flow-switching device 2, and the other end is connected to the compressor 1. Although an example of application of the accumulator 6 is given here and in the following description, the accumulator 6 is not the only option, and a receiver may also be an option.

[Use-Side Cycle]

The pump 51 is a device that sucks the use-side heat medium in a liquid state, increases the pressure thereof, and delivers the use-side heat medium at an increased pressure. The pump 51 is, for example, an inverter centrifugal pump or a turbo-type non-positive displacement pump. The use-side heat exchangers 52 (the use-side heat exchanger 52a and the use-side heat exchanger 52b) are devices that cause heat exchange to be performed between the air supplied from the use-side fans 60 (the use-side fan 60a and the use-side fan 60b) and the use-side heat medium. Each of the use-side heat exchangers 52 is formed of, for example, a fin-and-tube heat exchanger.

Regarding the use-side heat exchanger 52, one end is connected to the forward pipe 81a, and the other end is connected to the pressure-reducing device 53 (a related one of the pressure-reducing device 53a and the pressure-reducing device 53b). The use-side heat exchanger 52, during the cooling operation, functions as an evaporator. Accordingly, the use-side heat medium at low temperature receives heat from air at a temperature higher than the temperature of the low-temperature use-side heat medium and thus cools the air. In addition, the use-side heat exchanger 52, during the heating operation, functions as a condenser. Accordingly, the use-side heat medium at high temperature transfers heat to air at a temperature lower than the temperature of the high-temperature use-side heat medium and thus heats the air. Although an example of applying a fin-and-tube heat exchanger to the use-side heat exchanger 52 is given here and in the following description, the fin-and-tube heat exchanger is not the only option, and a plate heat exchanger, for example, may be applied to the use-side heat exchanger 52.

The pressure-reducing devices 53 (the pressure-reducing device 53a and the pressure-reducing device 53b) are devices that reduce the pressure of the use-side heat medium that passes therethrough. Each of the pressure-reducing devices 53 is formed of, for example, a device, such as an electronic expansion valve, whose opening degree can be variably controlled. Regarding the pressure-reducing device 53, one end is connected to the use-side heat exchanger 52 (a related one of the use-side heat exchanger 52a and the use-side heat exchanger 52b), and the other end is connected to the return pipe 81b. Although an example of applying an electronic expansion valve to the pressure-reducing device 53 is given here and in the following description, the electronic expansion valve is not the only the option, and a capillary tube, for example, may be applied to the pressure-reducing device 53.

The cooling-dedicated first on-off valve 54a, the cooling-dedicated second on-off valve 54b, and the cooling-dedicated third on-off valve 54c and also the heating-dedicated first on-off valve 55a, the heating-dedicated second on-off valve 55b, and the heating-dedicated third on-off valve 55c are valves that switch between the flow passage during the cooling operation and the flow passage during the heating operation. The on-off valves serve as a use-side flow-switching device that switches flow passages of the use-side cycle 120. Hereinafter, when the valves are not identified from one another, each of the valves is often referred to as a related one of a cooling-dedicated on-off valve 54 and a heating-dedicated on-off valve 55. The cooling-dedicated on-off valve 54 and the heating-dedicated on-off valve 55 switch the flow passages to perform switching of the heat exchanger that functions as a condenser and an evaporator. Each of the cooling-dedicated on-off valve 54 and the heating-dedicated on-off valve 55 is formed of, for example, a valve, such as a solenoid valve, that can be opened and closed. During the cooling operation, the flow passage of the use-side cycle 120 is as follows: the pump 51, the cooling-dedicated second on-off valve 54b, the forward pipe 81a, the use-side heat exchanger 52, the pressure-reducing device 53, the return pipe 81b, the cooling-dedicated third on-off valve 54c, the intermediate heat exchanger 5, the cooling-dedicated first on-off valve 54a, and the pump 51. At this time, the intermediate heat exchanger 5 functions as a condenser, and the use-side heat exchanger 52 functions as an evaporator. During the heating operation, the flow passage of the use-side cycle 120 is as follows: the pump 51, the heating-dedicated second on-off valve 55b, the intermediate heat exchanger 5, the heating-dedicated third on-off valve 55c, the forward pipe 81a, the use-side heat exchanger 52, the pressure-reducing device 53, the return pipe 81b, the heating-dedicated first on-off valve 55a, and the pump 51. At this time, the intermediate heat exchanger 5 functions as an evaporator, and the use-side heat exchanger 52 functions as a condenser. Although an example of applying a solenoid valve to each of the cooling-dedicated on-off valve 54 and the heating-dedicated on-off valve 55 is given here and in the following description, the solenoid valve is not the only option, and a three-way valve or a device formed of combined two-way valves may be applied to each of the cooling-dedicated on-off valve 54 and the heating-dedicated on-off valve 55.

The cooling-dedicated first on-off valve 54a is a valve that opens and closes the flow passage connecting the intermediate heat exchanger 5 and the pump 51 to one another. Regarding the cooling-dedicated first on-off valve 54a, one end is connected to the intermediate heat exchanger 5, and the other end is connected to the pump 51. The cooling-dedicated first on-off valve 54a, during the cooling operation, is opened to open the flow passage connecting the intermediate heat exchanger 5 to the pump 51. In addition, the cooling-dedicated first on-off valve 54a, during the heating operation, is closed to close the flow passage for the intermediate heat exchanger 5 and the pump 51.

The cooling-dedicated second on-off valve 54b is a valve that opens and closes the flow passage connecting the pump 51 and the forward pipe 81a to one another. Regarding the cooling-dedicated second on-off valve 54b, one end is connected to the pump 51, and the other end is connected to the forward pipe 81a. The cooling-dedicated second on-off valve 54b, during the cooling operation, is opened to open the flow passage connecting the pump 51 to the forward pipe 81a. In addition, the cooling-dedicated second on-off valve 54b, during the heating operation, is closed to close the flow passage for the pump 51 and the forward pipe 81a.

The cooling-dedicated third on-off valve 54c is a valve that opens and closes the flow passage connecting the return pipe 81b and the intermediate heat exchanger 5 to one another. Regarding the cooling-dedicated third on-off valve 54c, one end is connected to the return pipe 81b, and the other end is connected to the intermediate heat exchanger 5. The cooling-dedicated third on-off valve 54c, during the cooling operation, is opened to open the flow passage connecting the return pipe 81b to the intermediate heat exchanger 5. In addition, the cooling-dedicated third on-off valve 54c, during the heating operation, is closed to close the flow passage for the return pipe 81b and the intermediate heat exchanger 5.

The heating-dedicated first on-off valve 55a is a valve that opens and closes the flow passage connecting the return pipe 81b and the pump 51 to one another. The heating-dedicated first on-off valve 55a is disposed on a pipe connecting a pipe between the return pipe 81b and the cooling-dedicated third on-off valve 54c to a pipe between the cooling-dedicated first on-off valve 54a and the pump 51. The heating-dedicated first on-off valve 55a, during the cooling operation, is closed to close the flow passage connecting the return pipe 81b to the pump 51. In addition, the heating-dedicated first on-off valve 55a, during the heating operation, is opened to open the flow passage for the return pipe 81b and the pump 51.

The heating-dedicated second on-off valve 55b is a valve that opens and closes the flow passage connecting the pump 51 and the intermediate heat exchanger 5 to one another. The heating-dedicated second on-off valve 55b is disposed on a pipe connecting a pipe between the pump 51 and the cooling-dedicated second on-off valve 54b to a pipe between the cooling-dedicated third on-off valve 54c and the intermediate heat exchanger 5. The heating-dedicated second on-off valve 55b, during the cooling operation, is closed to close the flow passage connecting the pump 51 to the intermediate heat exchanger 5. In addition, the heating-dedicated second on-off valve 55b, during the heating operation, is opened to open the flow passage for the pump 51 and the intermediate heat exchanger 5.

The heating-dedicated third on-off valve 55c is a valve that opens and closes the flow passage connecting the intermediate heat exchanger 5 and the forward pipe 81a to one another. The heating-dedicated third on-off valve 55c is disposed on a pipe connecting a pipe between the intermediate heat exchanger 5 and the cooling-dedicated first on-off valve 54a to a pipe between the cooling-dedicated second on-off valve 54b and the forward pipe 81a. The heating-dedicated third on-off valve 55c, during the cooling operation, is closed to close the flow passage connecting the intermediate heat exchanger 5 to the forward pipe 81a. In addition, the heating dedicated third on-off valve 55c, during the heating operation, is opened to open the flow passage for the intermediate heat exchanger 5 and the forward pipe 81a.

Each of the forward pipe 81a and the return pipe 81b is a pipe connecting the outdoor unit 101 and the indoor unit 102 to one another and forming the flow passage of the use-side cycle 120. Each of the forward pipe 81a and the return pipe 81b is formed of, for example, a copper pipe. Regarding the forward pipe 81a, one end is connected to the cooling-dedicated second on-off valve 54b and the heating-dedicated third on-off valve 55c, and the other end is connected to the use-side heat exchanger 52. Regarding the return pipe 81b, one end is connected to the pressure-reducing device 53, and the other end is connected to the cooling-dedicated third on-off valve 54c. Here, existing pipes are preferably used for the forward pipe 81a and the return pipe 81b in view of, for example, initial cost reduction.

[Heat Source-Side Heat Medium]

The heat source-side heat medium that circulates through the heat source-side cycle 110 is a medium that transfers mainly the heat exchanged between outdoor air and the use-side heat medium. The heat source-side heat medium used in Embodiment 1 is a refrigerant for an air-conditioning apparatus, such as R32. Although an example of applying an R32 refrigerant to the heat source-side heat medium is given here and in the following description, the R32 refrigerant is not the only option. Examples of the heat source-side heat medium may be R1123, R1132(E), R1234yf, R1234ze(E), R1234ze(Z), R290, and a refrigerant made by mixing plural refrigerants of the above-described refrigerants.

[Use-Side Heat Medium]

The use-side heat medium that circulates through the use-side cycle 120 is refrigerant that transfers mainly the heat exchanged between the indoor air and the use-side heat medium. The use-side heat medium used in Embodiment 1 is a nonflammable refrigerant for an air-conditioning apparatus, such as R466A. Although an example of application of an R466A refrigerant is given here and in the following description, the R466A refrigerant is not the only option. Examples of the use-side heat medium may be R134a, R1233zd(E), R1243zf, R1216, R1336mzz(Z), R13I1, R744, and a nonflammable refrigerant made by mixing plural refrigerants of the above-described refrigerants.

[Controller]

A controller 91 controls the operations of the entire air-conditioning apparatus based on detection signals from various sensors (not illustrated) installed in or on, for example, the outdoor unit 101 and the indoor units 102 and based on an operation signal from an operation unit (not illustrated). In particular, the controller 91 drives and controls actuators such as the compressor 1, the expansion device 4, the heat source-side fan 10, the pump 51, and the use-side fan 60. The controller 91 includes a microcomputer provided with, for example, a CPU (Central Processing Unit), a ROM (Read Only Memory), a RAM (Random Access Memory), and an I/O port. Here, although the instance where the controller 91 is installed in the outdoor unit 101, as FIG. 1 illustrates, is described in Embodiment 1, the installation site of the controller 91 is not particularly limited. For example, the controller 91 may be provided in one of the indoor unit 102a and the indoor unit 102b. Alternatively, the controller 91 may be disposed independently from the outdoor unit 101 or other units.

[Cooling Operation]

Figure 2:
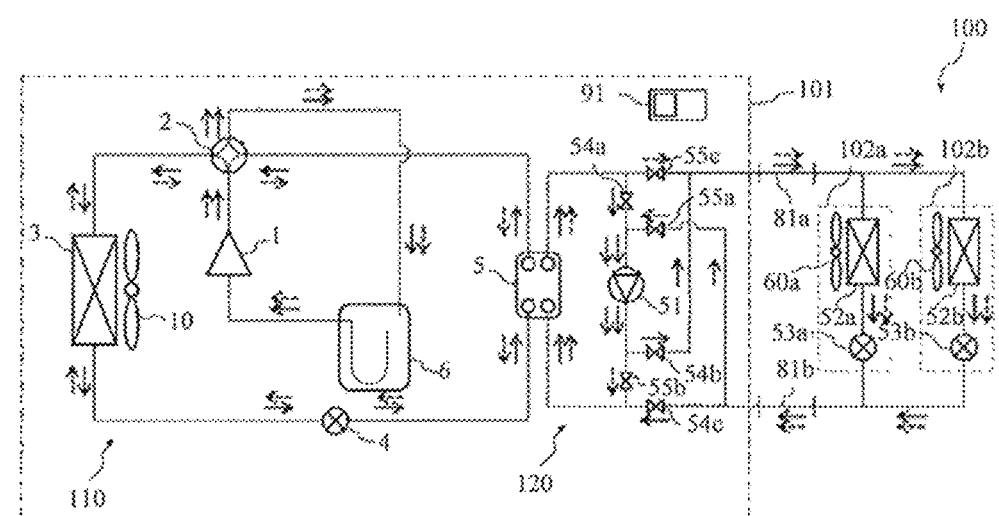
FIG. 2 illustrates heat-medium flows during a cooling operation and a heating operation of the air-conditioning apparatus according to Embodiment 1.

FIG. 2 illustrates heat-medium flows during the cooling operation and the heating operation of the air-conditioning apparatus according to Embodiment 1. The solid line and the broken line in FIG. 2 represent respectively the flow of the heat medium during the cooling operation and the flow of the heat medium during the heating operation. The flows of the heat medium, with the operation of each device, will be described here.

First, the flow of the heat source-side heat medium during the cooling operation will be described. Here, in the description of the heat source-side cycle 110 during the cooling operation, high pressure is defined as a pressure at which a saturation temperature is higher than the temperature of outdoor air. In addition, low pressure is defined as a pressure at which a saturation temperature is lower than the temperature of indoor air. The compressor 1 compresses the sucked low-pressure gaseous heat source-side heat medium and discharges the high-pressure gaseous heat source-side heat medium. The high-pressure gaseous heat source-side heat medium flows into the heat source-side heat exchanger 3 via the heat source-side flow-switching device 2. By using the outdoor air supplied from the heat source-side fan 10, the heat source-side heat exchanger 3 cools the high-pressure gaseous heat source-side heat medium to condense and liquefy the gaseous heat source-side heat medium. The heat source-side heat medium that has been condensed and liquefied at the heat source-side heat exchanger 3 to turn to a high-pressure liquid state flows into the expansion device 4. The expansion device 4 reduces the pressure of the high-pressure liquid heat source-side heat medium. The heat source-side heat medium whose pressure has been reduced at the expansion device 4 and that has turned to a low-pressure two-phase state flows into the intermediate heat exchanger 5. The intermediate heat exchanger 5 exchanges heat between the low-pressure two-phase heat source-side heat medium and the use-side heat medium circulating in the use-side cycle 120. The low-pressure two-phase heat source-side heat medium is heated to be evaporated and gasified. The heat source-side heat medium that has been evaporated and gasified at the intermediate heat exchanger 5 to turn to a low-pressure gaseous state is sucked again into the compressor 1 via the heat source-side flow-switching device 2 and the accumulator 6.

Next, the flow of the use-side heat medium during the cooling operation will be described. Here, in the description of the use-side cycle 120 during the cooling operation, medium-temperature pressure is defined as a pressure that is lower than the pressure of the indoor air and at which a saturation temperature is higher than the low-pressure saturation temperature of the heat source-side heat medium. The pump 51 increases the pressure of the sucked liquid use-side heat medium at medium-temperature pressure. The liquid use-side heat medium at medium-temperature pressure flows into the use-side heat exchanger 52 via the cooling-dedicated second on-off valve 54b and the forward pipe 81a. Due to heat exchange with the indoor air supplied from the use-side fan 60, the use-side heat exchanger 52 heats the liquid use-side heat medium at medium-temperature pressure to evaporate and gasify the liquid use-side heat medium. The use-side heat medium that has been evaporated and gasified at the use-side heat exchanger 52 to turn to a medium temperature-pressure gaseous state flows into the intermediate heat exchanger 5 via the pressure-reducing device 53, the return pipe 81b, and the cooling-dedicated third on-off valve 54c. The intermediate heat exchanger 5 exchanges heat between the gaseous use-side heat medium at medium-temperature pressure and the heat source-side heat medium circulating in the heat source-side cycle 110. The gaseous use-side heat medium at medium-temperature pressure is cooled to be condensed and liquefied. The use-side heat medium that has been condensed and liquefied at the intermediate heat exchanger 5 to turn to a medium temperature-pressure liquid state is sucked again into the pump 51 via the cooling-dedicated first on-off valve 54a. Here, during the cooling operation, the use-side heat medium transfers heat to the heat source-side heat medium and receives heat from the indoor air. Thus, the relationship regarding temperature is as follows: the temperature of the indoor air>the saturation temperature of the use-side heat medium>the low-pressure saturation temperature of the heat source-side heat medium.

[Heating Operation]

Next, the flow of the heat source-side heat medium during the heating operation will be described. Here, in the description of the heat source-side cycle 110 during the heating operation, high pressure is defined as a pressure at which a saturation temperature is higher than the temperature of the indoor air. In addition, low pressure is defined as a pressure at which a saturation temperature is lower than the temperature of the outdoor air. The compressor 1 compresses the sucked low-pressure gaseous heat source-side heat medium and discharges the high-pressure gaseous heat source-side heat medium. The high-pressure gaseous heat source-side heat medium flows into the intermediate heat exchanger 5 via the heat source-side flow-switching device 2. The intermediate heat exchanger 5 exchanges heat between the high-pressure gaseous heat source-side heat medium and the use-side heat medium circulating in the use-side cycle 120. The high-pressure gaseous heat source-side heat medium is cooled to be condensed and liquefied. The heat source-side heat medium that has been condensed and liquefied at the intermediate heat exchanger 5 to turn to a high-pressure liquid state flows into the expansion device 4. The expansion device 4 reduces the pressure of the high-pressure liquid heat source-side heat medium. The heat source-side heat medium whose pressure has been reduced at the expansion device 4 and that has turned to a low-pressure two-phase state flows into the heat source-side heat exchanger 3. By using the outdoor air supplied from the heat source-side fan 10, the heat source-side heat exchanger 3 heats the low-pressure two-phase heat source-side heat medium to evaporate and gasify the two-phase heat source-side heat medium. The heat source-side heat medium that has been evaporated and gasified at the heat source-side heat exchanger 3 to turn to a low-pressure gaseous state is sucked again into the compressor 1 via the heat source-side flow-switching device 2 and the accumulator 6.

Lastly, the flow of the use-side heat medium during the heating operation will be described. Here, in the description of the use-side cycle 120 during the heating operation, medium-temperature pressure is defined as a pressure that is higher than the pressure of the indoor air and at which a saturation temperature is lower than the high-pressure saturation temperature of the heat source-side heat medium. The pump 51 increases the pressure of the sucked liquid use-side heat medium at medium-temperature pressure. The liquid use-side heat medium at medium-temperature pressure flows into the intermediate heat exchanger 5 via the heating-dedicated second on-off valve 55b. The intermediate heat exchanger 5 exchanges heat between the liquid use-side heat medium at medium-temperature pressure and the heat source-side heat medium circulating in the heat source-side cycle 110. The liquid use-side heat medium at medium-temperature pressure is heated to be evaporated and gasified. The use-side heat medium that has been evaporated and gasified at the intermediate heat exchanger 5 to turn to a medium temperature-pressure gaseous state flows into the use-side heat exchanger 52 via the heating-dedicated third on-off valve 55c and the forward pipe 81a. Due to heat exchange with the indoor air supplied from the use-side fan 60, the use-side heat exchanger 52 cools the gaseous use-side heat medium at medium-temperature pressure to condense and liquefy, and make the gaseous use-side heat medium into a device. The use-side heat medium that has been condensed and liquefied at the use-side heat exchanger 52 to turn to a medium temperature-pressure liquid state is sucked again into the pump 51 via the heating-dedicated first on-off valve 55a. Here, during the heating operation, the use-side heat medium receives heat from the heat source-side heat medium and transfers heat to the indoor air. Thus, the relationship regarding temperature is as follows: the temperature of the indoor air<the saturation temperature of the use-side heat medium<the low-pressure saturation temperature of the heat source-side heat medium. Thus, the controller 91 controls each device so that the use-side heat medium in the use-side cycle 120 during the heating operation has a temperature and a pressure higher than the temperature and the pressure of the use-side heat medium in the use-side cycle 120 during the cooling operation.

In addition, the controller 91 performs a control so that, at the intermediate heat exchanger 5, the evaporating temperature of the use-side heat medium during the heating operation is higher than the condensing temperature of the use-side heat medium during the cooling operation and so that, at the use-side heat exchanger 52, the condensing temperature of the use-side heat medium during the heating operation is higher than the evaporating temperature of the use-side heat medium during cooling operation.

Advantageous Effects

In the use-side cycle 120, the air-conditioning apparatus 100 of Embodiment 1 drives the pump 51 configured to suck and deliver the liquid use-side heat medium, heats or cools the use-side heat medium to cause phase change at the intermediate heat exchanger 5, and delivers the use-side heat medium to the use-side heat exchanger 52. The use-side heat exchanger 52 performs air-conditioning by heating or cooling the air in the air-conditioning target space. The air-conditioning apparatus 100 performs the cooling operation and the heating operation by using the use-side heat medium that undergoes a phase change, and the capacity per a unit flow rate can thereby be increased, compared with the instance where a heat medium, such as water, that does not undergo a phase change is used. Thus, the air-conditioning apparatus 100 is capable of efficiently cooling and heating the inside of the room.

In addition, according to the air-conditioning apparatus 100 of Embodiment 1, the use-side flow-switching device switches the flow passages of the use-side cycle 120 between the cooling operation and the heating operation. Thus, the air-conditioning apparatus 100 is capable of switching between the cooling operation and the heating operation in response to an operation request from the indoor unit 102. At this time, in both the cooling operation and the heating operation, the flow passages are formed so that the use-side heat mediums in both the operations flow into the pump 51 in the same direction and flow out from the pump 51 in the same direction, and it is thereby possible to cause the liquid use-side heat medium to pass therethrough and to suppress the gaseous use-side heat medium from passing therethrough. Thus, it is possible to prevent air entrainment, that is, idling of the motor of the pump 51 from occurring and to avoid a breakdown of the pump 51. In addition, as the use-side flow-switching device, there are installed the cooling-dedicated first on-off valve 54a, the cooling-dedicated second on-off valve 54b, and the cooling-dedicated third on-off valve 54c and the heating-dedicated first on-off valve 55a, the heating-dedicated second on-off valve 55b, and the heating-dedicated third on-off valve 55c. The controller 91, during the cooling operation, opens the cooling-dedicated first on-off valve 54a, the cooling-dedicated second on-off valve 54b, and the cooling-dedicated third on-off valve 54c to cause the use-side heat medium to pass through the valves. In addition, the controller 91, during the heating operation, opens the heating-dedicated first on-off valve 55*a*, the heating-dedicated second on-off valve 55*b*, and the heating-dedicated third on-off valve 55*c* to cause the use-side heat medium to pass through the valves. Thus, the flow passages can efficiently be switched by, for example, the flow passages being closed more reliably.

According to the air-conditioning apparatus 100 of Embodiment 1, reduction in the size of the pump 51 and in the thicknesses of the pipes and high efficiency of the system, for example, can be achieved by using a heat medium that undergoes a phase change. In addition, a nonflammable heat medium is used as the use-side heat medium in the air-conditioning apparatus 100, and there is thus no need for, for example, installation of a safety precaution device that is required to reduce a risk such as ignition caused by heat medium leakage. The temperature of the use-side heat medium circulating through the use-side cycle 120 does not become higher than the indoor temperature during the cooling operation and does not become higher than the temperature of the heat source-side heat medium during the heating operation. Thus, it is possible to suppress, for example, the decomposition reaction of the heat medium and refrigerating machine oil accompanying a temperature rise from occurring.

Embodiment 2

Figure 3:
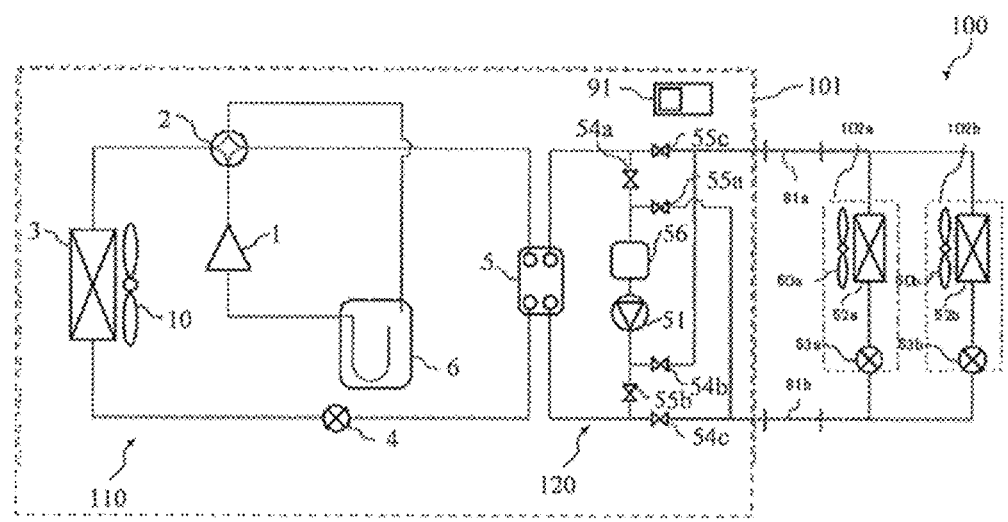
FIG. 3 schematically illustrates an example of the configuration of an air-conditioning apparatus according to Embodiment 2.

FIG. 3 schematically illustrates an example of the configuration of an air-conditioning apparatus according to Embodiment 2. Here, regarding an air-conditioning apparatus 100 in FIG. 3, a device or a part having the same configuration as the device or the part of the air-conditioning apparatus 100 in FIG. 1 is given the same reference as that given for the device or the part in FIG. 1. The air-conditioning apparatus 100 in FIG. 3 differs from the air-conditioning apparatus 100 in FIG. 1 in that an outdoor unit 101 has a different configuration.

[Outdoor Unit]

The outdoor unit 101 of Embodiment 2 is equipped with a receiver 56 that is an element of the use-side cycle 120.

[Use-Side Cycle]

In the receiver 56, there accumulates a surplus use-side heat medium generated due to the difference between the heating operation and the cooling operation or a surplus use-side heat medium generated due to a transient change of operation. In addition, the receiver 56 of Embodiment 2 suppresses the gaseous use-side heat medium from flowing into the pump 51. Regarding the receiver 56, one end is connected to the pipe connecting the cooling-dedicated first on-off valve 54*a* to the pump 51 and positioned downstream the junction with the pipe on which the heating-dedicated first on-off valve 55*a* is disposed, and the other end is connected to the pump 51. Although the configuration of the air-conditioning apparatus 100 having the receiver 56 is given here as an example, the configuration may include, for example, a gas-liquid separator instead of the receiver 56.

[Cooling Operation]

Figure 4:
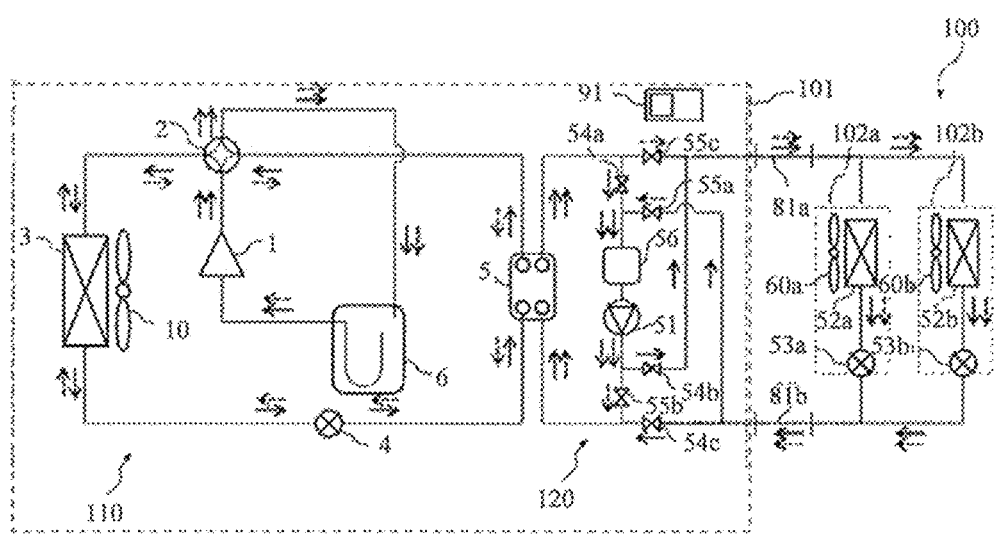
FIG. 4 illustrates heat-medium flows during a cooling operation and a heating operation of the air-conditioning apparatus according to Embodiment 2.

FIG. 4 illustrates heat-medium flows during the cooling operation and the heating operation of the air-conditioning apparatus according to Embodiment 2. The solid line and the broken line in FIG. 4 represent respectively the flow of the heat medium during the cooling operation and the flow of the heat medium during the heating operation. The flows of the heat medium, with the operation of each device, will be described here. The flows of the heat source-side heat medium in the heat source-side cycle 110 and the operations of the devices during the cooling operation and the heating operation are similar to those described in Embodiment 1.

The flow of the use-side heat medium during the cooling operation will be described. The pump 51 increases the pressure of the sucked liquid use-side heat medium at medium-temperature pressure. The liquid use-side heat medium at medium-temperature pressure flows into the use-side heat exchanger 52 via the cooling-dedicated second on-off valve 54*b* and the forward pipe 81*a*. Due to heat exchange with the indoor air supplied from the use-side fan 60, the use-side heat exchanger 52 heats the liquid use-side heat medium at medium-temperature pressure to evaporate and gasify the liquid use-side heat medium. The use-side heat medium that has been evaporated and gasified at the use-side heat exchanger 52 to turn to a medium temperature-pressure gaseous state flows into the intermediate heat exchanger 5 via the pressure-reducing device 53, the return pipe 81*b*, and the cooling-dedicated third on-off valve 54*c*. The intermediate heat exchanger 5 causes heat exchange to be performed between the gaseous use-side heat medium at medium-temperature pressure and the heat source-side heat medium circulating in the heat source-side cycle 110. The gaseous use-side heat medium at medium-temperature pressure is cooled to be condensed and liquefied. The use-side heat medium that has been condensed and liquefied at the intermediate heat exchanger 5 to turn to a medium temperature-pressure liquid state is sucked again into the pump 51 via the cooling-dedicated first on-off valve 54*a* and the receiver 56.

[Heating Operation]

Next, the flow of the use-side heat medium during the heating operation will be described. The pump 51 increases the pressure of the sucked liquid use-side heat medium at medium-temperature pressure. The liquid use-side heat medium at medium-temperature pressure flows into the intermediate heat exchanger 5 via the heating-dedicated second on-off valve 55*b*. The intermediate heat exchanger 5 causes heat exchange to be performed between the liquid use-side heat medium at medium-temperature pressure and the heat source-side heat medium circulating in the heat source-side cycle 110. The liquid use-side heat medium at medium-temperature pressure is heated to be evaporated and gasified. The use-side heat medium that has been evaporated and gasified at the intermediate heat exchanger 5 to turn to a medium temperature-pressure gaseous state flows into the use-side heat exchanger 52 via the heating-dedicated third on-off valve 55*c* and the forward pipe 81*a*. Due to heat exchange with the indoor air supplied from the use-side fan 60, the use-side heat exchanger 52 cools the gaseous use-side heat medium at medium-temperature pressure to condense and make the use-side heat medium into a device. The use-side heat medium that has been condensed and liquefied at the use-side heat exchanger 52*a* to turn to a medium temperature-pressure liquid state is sucked again into the pump 51 via the heating-dedicated first on-off valve 55*a* and the receiver 56.

[Function of Receiver]

Figure 5:
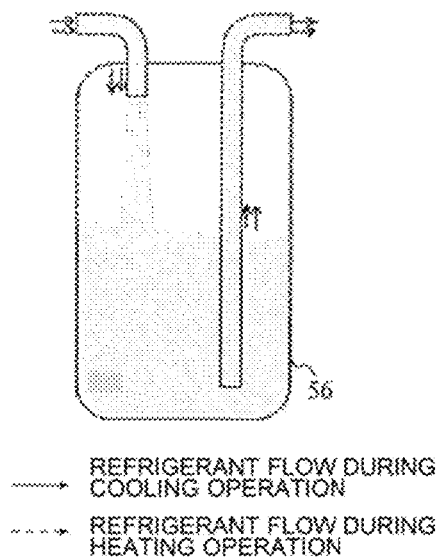
FIG. 5 illustrates the flows and states of the use-side heat medium in a receiver during the cooling operation and the heating operation of the air-conditioning apparatus according to Embodiment 2.

FIG. 5 illustrates the flows and the states of the use-side heat medium in the receiver during the cooling operation and the heating operation of the air-conditioning apparatus according to Embodiment 2. The solid line and the broken line in FIG. 5 represent respectively the flow of the heat medium during the cooling operation and the flow of the heat medium during the heating operation. In addition, in the receiver 56 in FIG. 5, a part not filled in with a solid color represents the gaseous use-side heat medium, and a part filled in with a solid color represents the liquid use-side heat medium. Here, as FIG. 5 illustrates, in the receiver 56, the flow directions of the use-side heat medium during the heating operation and the cooling operation are the same.

Based on FIG. 5, the function of the receiver 56 when the use-side heat medium in a two-phase gas-liquid state flows into the receiver 56 will be described. The speed of the flow of the two-phase use-side heat medium that has flowed into the receiver 56 from an inlet decreases in a container of the receiver 56. The gaseous use-side heat medium having a low density moves upward, and the liquid use-side heat medium having a high density moves downward to be separated from one another in the container. Only the separated liquid use-side heat medium passes through an outlet pipe having an inflow port positioned near the bottom of the receiver 56, and the liquid use-side heat medium flows out from the outlet pipe. Although an example where the two-phase use-side heat medium flows into the receiver 56 is described here, the two-phase use-side heat medium is not the only option, and the liquid use-side heat medium may flow into the receiver 56.

Advantageous Effects

The air-conditioning apparatus 100 of Embodiment 2 has the receiver 56 disposed in the use-side cycle 120, and the receiver 56 separates the gaseous use-side heat medium and the liquid use-side heat medium from one another and causes the liquid use-side heat medium to pass through the receiver 56. Thus, it is possible for the air-conditioning apparatus 100 of Embodiment 2 to have a configuration preventing the gaseous use-side heat medium from flowing into the pump 51 much more reliably than the configuration of Embodiment 1. Consequently, it is possible to avoid a breakdown of the pump 51.

Embodiment 3

Figure 6:
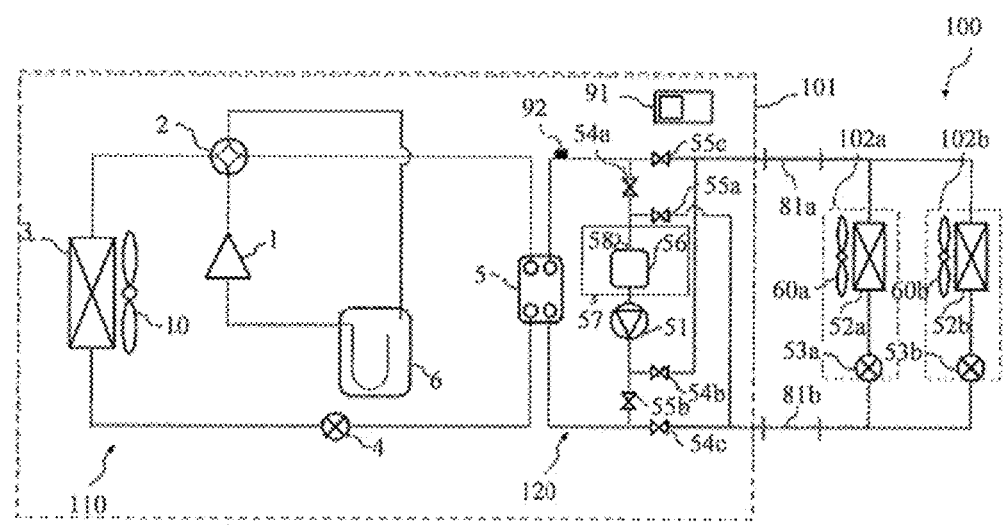
FIG. 6 schematically illustrates an example of the configuration of an air-conditioning apparatus according to Embodiment 3.

FIG. 6 schematically illustrates an example of the configuration of an air-conditioning apparatus according to Embodiment 3. Here, regarding an air-conditioning apparatus 100 in FIG. 6, a device or a part having the same configuration as the device or the part of the air-conditioning apparatus 100 in FIG. 1 is given the same reference as that given for the device or the part in FIG. 1. The air-conditioning apparatus 100 in FIG. 6 differs from the air-conditioning apparatus 100 in FIG. 1 in that an outdoor unit 101 has a different configuration.
[Outdoor Unit]
The outdoor unit 101 of Embodiment 3 is equipped with, in the use-side cycle 120, a decomposition-product precipitation device 57 and an intermediate-heat-exchanger outlet temperature sensor 92.
[Use-Side Cycle]
The decomposition-product precipitation device 57 is a device having the receiver 56, which is described in Embodiment 2, having the receiver 56. In the cooling device 58, there accumulates a surplus use-side heat medium generated due to the difference between the heating operation and the cooling operation or a surplus use-side heat medium generated due to a transient change of operation. The decomposition-product precipitation device 57 of Embodiment 3 suppresses the gaseous use-side heat medium from flowing into the pump 51 and also precipitates and holds, therein, a substance generated by the use-side heat medium being, for example, decomposed or denatured. Regarding the decomposition-product precipitation device 57, one end is connected to the pipe connecting the cooling-dedicated first on-off valve 54a to the pump 51 and positioned downstream the junction with the pipe on which the heating-dedicated first on-off valve 55a is disposed, and the other end is connected to the pump 51.

Figure 7:
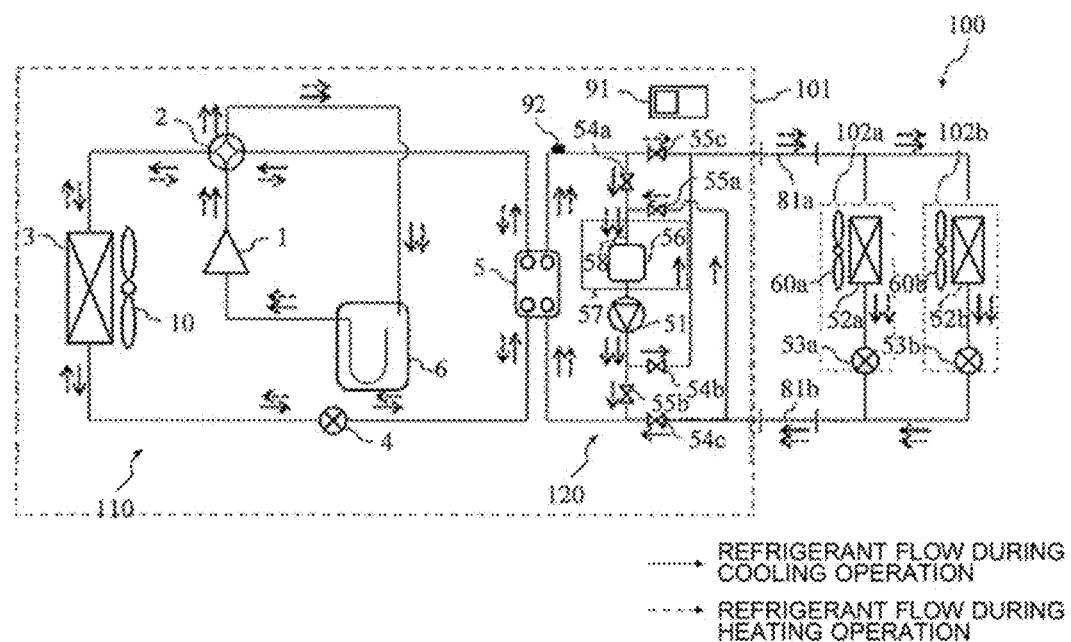
FIG. 7 illustrates heat-medium flows during a cooling operation and a heating operation of the air-conditioning apparatus according to Embodiment 3.

The intermediate-heat-exchanger outlet temperature sensor 92 is a detection device that detects a temperature of the use-side heat medium on the heat-medium outflow side of the intermediate heat exchanger 5. The intermediate-heat-exchanger outlet temperature sensor 92 is connected to the pipe connecting the intermediate heat exchanger 5 to the cooling-dedicated first on-off valve 54a and positioned upstream the junction with the pipe on which the heating-dedicated third on-off valve 55c is disposed.
[Use-Side Heat Medium]
Examples of the use-side heat medium that circulates through the use-side cycle 120 are refrigerants for an air-conditioning apparatus, such as R466A, R13I1, and a mixed refrigerant containing R13I1, which are nonflammable. The use-side heat medium transfers mainly the heat exchanged between the indoor air and the use-side heat medium.
[Cooling Operation]
FIG. 7 illustrates heat-medium flows during the cooling operation and the heating operation of the air-conditioning apparatus according to Embodiment 3. The solid line and the broken line in FIG. 7 represent respectively the flow of the heat medium during the cooling operation and the flow of the heat medium during the heating operation. The flows of the heat medium, with the operation of each device, will be described here. The flows of the heat source-side heat medium in the heat source-side cycle 110 and the operations of the devices during the cooling operation and the heating operation are similar to those described in Embodiment 1.

The flow of the use-side heat medium during the cooling operation will be described. The pump 51 increases the pressure of the sucked liquid use-side heat medium at medium-temperature pressure. The liquid use-side heat medium at medium-temperature pressure flows into the use-side heat exchanger 52 via the cooling-dedicated second on-off valve 54b and the forward pipe 81a. Due to heat exchange with the indoor air supplied from the use-side fan 60, the use-side heat exchanger 52 heats the liquid use-side heat medium at medium-temperature pressure to evaporate and gasify the liquid use-side heat medium. The use-side heat medium that has been evaporated and gasified at the use-side heat exchanger 52 to turn to a medium temperature-pressure gaseous state flows into the intermediate heat exchanger 5 via the pressure-reducing device 53, the return pipe 81b, and the cooling-dedicated third on-off valve 54c. The intermediate heat exchanger 5 causes heat exchange to be performed between the gaseous use-side heat medium at medium-temperature pressure and the heat source-side heat medium circulating in the heat source-side cycle 110. The gaseous use-side heat medium at medium-temperature pressure is cooled to be condensed and liquefied. The use-side heat medium that has been condensed and liquefied at the intermediate heat exchanger 5 to turn to a medium temperature-pressure liquid state is sucked again into the pump 51 via the cooling-dedicated first on-off valve 54a and the decomposition-product precipitation device 57.

During the cooling operation, the intermediate-heat-exchanger outlet temperature sensor 92 detects a temperature of the liquid use-side heat medium at medium-temperature pressure that has flowed out from the intermediate heat exchanger 5. Based on the temperature detected by the intermediate-heat-exchanger outlet temperature sensor 92, the controller 91 controls the devices of the air-conditioning apparatus 100 so that the temperature of the use-side heat medium in the use-side cycle 120 does not exceed a predetermined set temperature. Here, in the use-side cycle 120, the controller 91 preferably performs a control with the temperature of each of R466A, R13I1, and a mixed refrigerant containing R13I1, which are nonflammable, being not higher than a temperature at which a reaction of the refrigerant, such as self-decomposition or change in quality can be suppressed from occurring. Specifically, such a set temperature at which the reaction of the refrigerant can be suppressed from occurring is preferably 100 degrees C. or less.

[Heating Operation]

Next, the flow of the use-side heat medium during the heating operation will be described. The pump 51 increases the pressure of the sucked liquid use-side heat medium at medium-temperature pressure. The liquid use-side heat medium at medium-temperature pressure flows into the intermediate heat exchanger 5 via the heating-dedicated second on-off valve 55b. The intermediate heat exchanger 5 causes heat exchange to be performed between the liquid use-side heat medium at medium-temperature pressure and the heat source-side heat medium circulating in the heat source-side cycle 110. The liquid use-side heat medium at medium-temperature pressure is heated to be evaporated and gasified. The use-side heat medium that has been evaporated and gasified at the intermediate heat exchanger 5 to turn to a medium temperature-pressure gaseous state flows into the use-side heat exchanger 52 via the heating-dedicated third on-off valve 55c and the forward pipe 81a. Due to heat exchange with the indoor air supplied from the use-side fan 60, the use-side heat exchanger 52 cools the gaseous use-side heat medium at medium-temperature pressure to condense and make the gaseous use-side heat medium into a device. The use-side heat medium that has been condensed and liquefied at the use-side heat exchanger 52 to turn to a medium temperature-pressure liquid state is sucked again into the pump 51 via the heating-dedicated first on-off valve 55a and the decomposition-product precipitation device 57.

During the heating operation, the intermediate-heat-exchanger outlet temperature sensor 92 detects a temperature of the gaseous use-side heat medium at medium-temperature pressure that has flowed out from the intermediate heat exchanger 5. Based on the temperature detected by the intermediate-heat-exchanger outlet temperature sensor 92, the controller 91 controls at least one of the compressor 1, the expansion device 4, the heat source-side fan 10, the pump 51, and the use-side fan 60. Here, in the use-side cycle 120, the controller 91 preferably performs the control so that the temperature of each of R466A, R13I1, and a mixed refrigerant containing R13I1 is not higher than a temperature at which a reaction of the refrigerant can be suppressed from occurring.

[Function of Decomposition-Product Precipitation Device]

Figure 8:
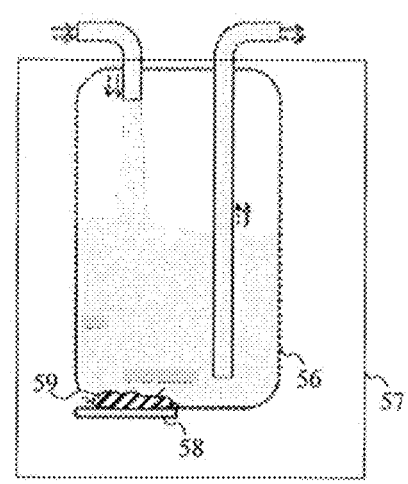
FIG. 8 illustrates the flows and states of the use-side heat medium in a decomposition-product precipitation device during the cooling operation and the heating operation of the air-conditioning apparatus according to Embodiment 3.

FIG. 8 illustrates the flows and the states of the use-side heat medium in the decomposition-product precipitation device during the cooling operation and the heating operation of the air-conditioning apparatus according to Embodiment 3. The solid line and the broken line in FIG. 8 represent respectively the flow of the heat medium during the cooling operation and the flow of the heat medium during the heating operation. In addition, in the receiver 56 in FIG. 8, a part not filled in with a solid color represents the gaseous use-side heat medium, and a part filled in with a solid color represents the liquid use-side heat medium.

Based on FIG. 8, the function of the decomposition-product precipitation device 57 when the use-side heat medium in a two-phase gas-liquid state flows into the decomposition-product precipitation device 57 will be described. The speed of the flow of the two-phase use-side heat medium that has flowed into the decomposition-product precipitation device 57 from an inlet decreases in a container of the decomposition-product precipitation device 57. The gaseous use-side heat medium having a low density moves upward, and the liquid use-side heat medium having a high density moves downward, and separation of the use-side heat medium is thereby performed in the container. Only the separated liquid use-side heat medium passes through an outlet pipe having an inflow port positioned near the bottom of the decomposition-product precipitation device 57, and the liquid use-side heat medium flows out from the outlet pipe.

On the other hand, a decomposition product 59 contained in the two-phase use-side heat medium that has flowed in from the inlet, together with the liquid use-side heat medium, stays in a lower portion of the decomposition-product precipitation device 57 in a separated manner. The cooling device 58 mounted on the bottom of the decomposition-product precipitation device 57 cools partially the liquid use-side heat medium. As FIG. 8 illustrates, the decomposition product 59, which is contained in the liquid use-side heat medium, is precipitated out of the cooled liquid use-side heat medium. The precipitated decomposition product 59 is held in the decomposition-product precipitation device 57 and accumulates on the bottom. Thus, it is possible to prevent the decomposition product 59 from circulating in the use-side cycle 120. Here, a device such as a Peltier cooler can be used for the cooling device 58. In addition, in the heat source-side cycle 110, with, for example, the pipe between the heat source-side flow-switching device 2 and the suction side of the compressor 1 serving as the cooling device 58, the liquid use-side heat medium may be cooled by, for example, low-temperature heat of the heat source-side heat medium. In addition, although an example where the two-phase use-side heat medium flows into the decomposition-product precipitation device 57 is described here, the two-phase use-side heat medium is not the only option, and the liquid use-side heat medium may flow into the decomposition-product precipitation device 57.

Advantageous Effects

The air-conditioning apparatus 100 of Embodiment 3 has the decomposition-product precipitation device 57 disposed in the use-side cycle 120, and the decomposition-product precipitation device 57 separates the gaseous use-side heat medium and the liquid use-side heat medium from one another and causes the liquid use-side heat medium to pass through the decomposition-product precipitation device 57. Thus, it is possible for the air-conditioning apparatus 100 of Embodiment 3 to have a configuration that prevents the gaseous use-side heat medium from flowing into the pump 51 much more reliably than the configuration of Embodiment 1. Consequently, it is possible to avoid a breakdown of the pump 51. In addition, the decomposition-product precipitation device 57 is configured to hold the decomposition product 59, which is contained in the liquid use-side heat medium, and to cause the decomposition product 59 to accumulate therein, and the decomposition product 59 is thereby prevented from circulating in the use-side cycle 120. Thus, it is possible to avoid a breakdown of the air-conditioning apparatus 100 resulting from, for example, corrosion and blockage of a flow passage caused by the decomposition product 59.

Moreover, in the air-conditioning apparatus 100 of Embodiment 3, there is mounted, in the use-side cycle 120, the intermediate-heat-exchanger outlet temperature sensor 92 that detects a temperature of the use-side heat medium that flows out from the intermediate heat exchanger 5. The controller 91 controls a device of the use-side cycle 120 based on the temperature detected by the intermediate-heat-exchanger outlet temperature sensor 92. Thus, the use-side heat medium can be prevented from, for example, being decomposed by a chemical reaction or other phenomena caused by heat, and the longevity of the entire air-conditioning apparatus can thereby be increased. In addition, it is possible to avoid a breakdown of the air-conditioning apparatus 100 resulting from, for example, corrosion and blockage of a flow passage caused by the decomposition product 59.

Embodiment 4

[Air-Conditioning Apparatus]

Figure 9:
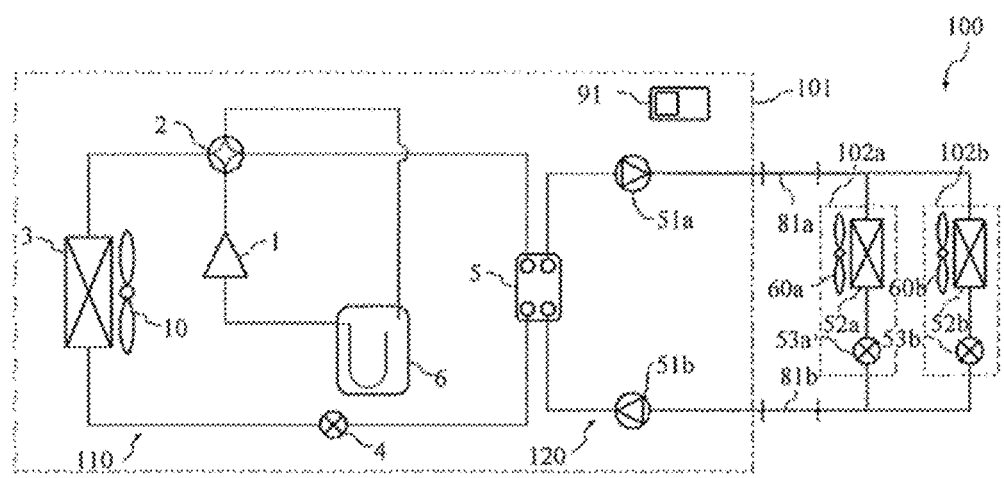
FIG. 9 schematically illustrates an example of the configuration of an air-conditioning apparatus according to Embodiment 4.

FIG. 9 schematically illustrates an example of the configuration of an air-conditioning apparatus according to Embodiment 4. Here, regarding an air-conditioning apparatus 100 in FIG. 9, a device or a part having the same configuration as the device or the part of the air-conditioning apparatus 100 in FIG. 1 is given the same reference as that given for the device or the part in FIG. 1. The air-conditioning apparatus 100 in FIG. 9 differs from the air-conditioning apparatus 100 in FIG. 1 in that an outdoor unit 101 has a different configuration.

[Outdoor Unit]

The outdoor unit 101 of Embodiment 4 is equipped with a cooling-dedicated pump 51a and a heating-dedicated pump 51b that are components of the use-side cycle 120. The cooling-dedicated first on-off valve 54a, the cooling-dedicated second on-off valve 54b, and the cooling-dedicated third on-off valve 54c and the heating-dedicated first on-off valve 55a, the heating-dedicated second on-off valve 55b, and the heating-dedicated third on-off valve 55c, which are installed in the air-conditioning apparatus 100 of Embodiment 1, are not installed here.

[Use-Side Cycle]

As with the pump 51 described in Embodiment 1, the cooling-dedicated pump 51a and the heating-dedicated pump 51b suck the liquid use-side heat medium, increase the pressure thereof, and deliver the use-side heat medium at increased pressure. Each of the cooling-dedicated pump 51a and the heating-dedicated pump 51b is, for example, a turbo-type non-positive displacement pump.

[Cooling Operation]

Figure 10:
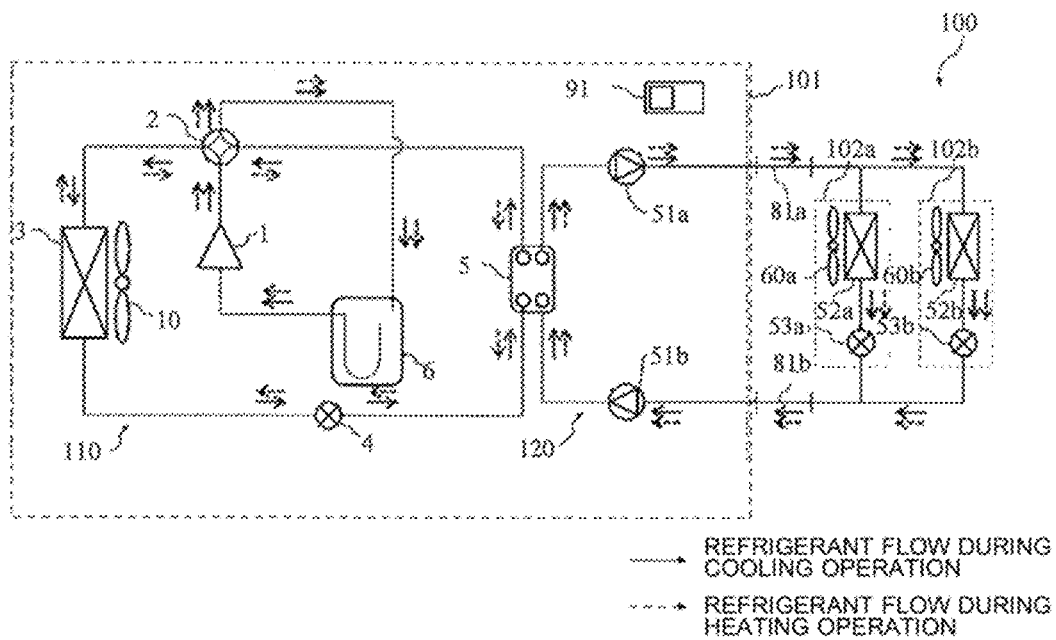
FIG. 10 illustrates heat-medium flows during a cooling operation and a heating operation of the air-conditioning apparatus according to Embodiment 4.

FIG. 10 illustrates heat-medium flows during the cooling operation and the heating operation of the air-conditioning apparatus according to Embodiment 4. The solid line and the broken line in FIG. 10 represent respectively the flow of the heat medium during the cooling operation and the flow of the heat medium during the heating operation. The flows of the heat medium, with the operation of each device, will be described here. The flows of the heat source-side heat medium in the heat source-side cycle 110 and the operations of the devices during the cooling operation and the heating operation are similar to those described in Embodiment 1.

The flow of the use-side heat medium during the cooling operation will be described. Here, during the cooling operation, the heating-dedicated pump 51b is stopped. The cooling-dedicated pump 51a increases the pressure of the sucked liquid use-side heat medium at medium-temperature pressure. The liquid use-side heat medium at medium-temperature pressure flows into the use-side heat exchanger 52 via the forward pipe 81a. Due to heat exchange with the indoor air supplied from the use-side fan 60, the use-side heat exchanger 52 heats the liquid use-side heat medium at medium-temperature pressure to evaporate and gasify the liquid use-side heat medium. The use-side heat medium that has been evaporated and gasified at the use-side heat exchanger 52 to turn to a medium temperature-pressure gaseous state flows into the intermediate heat exchanger 5 via the pressure-reducing device 53, the return pipe 81b, and the heating-dedicated pump 51b remaining stopped. The intermediate heat exchanger 5 exchanges heat between the gaseous use-side heat medium at medium-temperature pressure and the heat source-side heat medium circulating in the heat source-side cycle 110. The gaseous use-side heat medium at medium-temperature pressure is cooled to be condensed and liquefied. The use-side heat medium that has been condensed and liquefied at the intermediate heat exchanger 5 to turn to a medium temperature-pressure liquid state is sucked again into the cooling-dedicated pump 51a.

[Heating Operation]

Next, the flow of the use-side heat medium during the heating operation will be described. Here, during the heating operation, the cooling-dedicated pump 51a is stopped. The heating-dedicated pump 51b increases the pressure of the sucked liquid use-side heat medium at medium-temperature pressure. The liquid use-side heat medium at medium-temperature pressure flows into the intermediate heat exchanger 5. The intermediate heat exchanger 5 causes heat exchange to be performed between the liquid use-side heat medium at medium-temperature pressure and the heat source-side heat medium circulating in the heat source-side cycle 110. The liquid use-side heat medium at medium-temperature pressure is heated to be evaporated and gasified. The use-side heat medium that has been evaporated and gasified at the intermediate heat exchanger 5 to turn to a medium temperature-pressure gaseous state flows into the use-side heat exchanger 52 via the cooling-dedicated pump 51a remaining stopped and the forward pipe 81a. Due to heat exchange with the indoor air supplied from the use-side fan 60, the use-side heat exchanger 52 cools the gaseous use-side heat medium at medium-temperature pressure to condense and make the gaseous use-side heat medium into a device. The use-side heat medium that has been condensed and liquefied at the use-side heat exchanger 52 to turn to a medium temperature-pressure liquid state is sucked again into the heating-dedicated pump 51b via the pressure-reducing device 53 and the return pipe 81b.

Advantageous Effects

The air-conditioning apparatus 100 of Embodiment 4 is equipped with the cooling-dedicated pump 51a and the heating-dedicated pump 51b that are mounted in the use-side cycle 120. Thus, the air-conditioning apparatus 100 of Embodiment 4 is capable of switching between the cooling operation and the heating operation in response to an operation request from the indoor unit 102. In addition, in the air-conditioning apparatus 100 of Embodiment 4, the liquid use-side heat medium is caused to pass through the cooling-dedicated pump 51a and the heating-dedicated pump 51b that are in a state of being driven, and the gaseous use-side heat medium is suppressed from passing therethrough. Consequently, it is possible to avoid a breakdown of the cooling-dedicated pump 51a and the heating-dedicated pump 51b.

Embodiment 5

[Air-Conditioning Apparatus]

Figure 11:
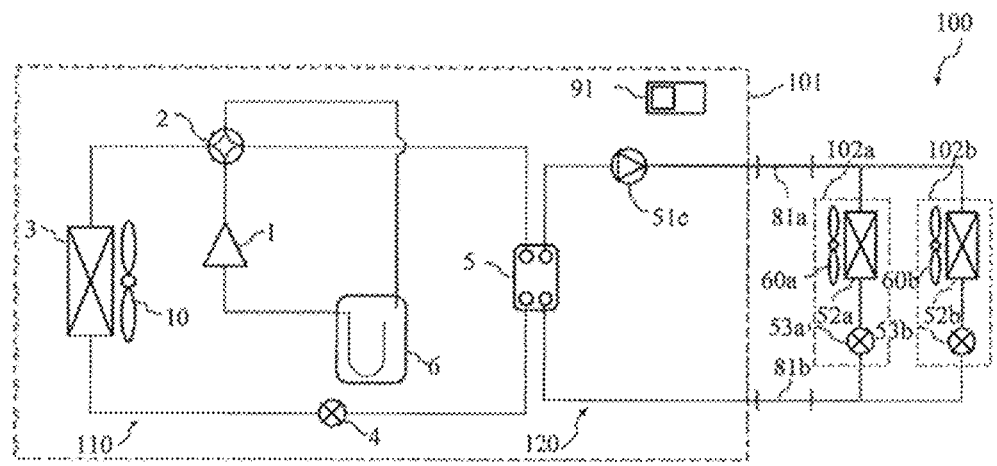
FIG. 11 schematically illustrates an example of the configuration of an air-conditioning apparatus according to Embodiment 5.

FIG. 11 schematically illustrates an example of the configuration of an air-conditioning apparatus according to Embodiment 5. Here, regarding an air-conditioning apparatus 100 in FIG. 11, a device or a part having the same configuration as the device or the part of the air-conditioning apparatus 100 in FIG. 9 is given the same reference as that given for the device or the part in FIG. 9. The air-conditioning apparatus 100 in FIG. 11 differs from the air-conditioning apparatus 100 in FIG. 9 in that an outdoor unit 101 has a different configuration.

[Outdoor Unit]

The outdoor unit 101 of Embodiment 5 is equipped with an inversion pump 51c that is an element of the use-side cycle 120, instead of the cooling-dedicated pump 51a and the heating-dedicated pump 51b included in the outdoor unit 101 of Embodiment 4.

[Use-Side Cycle]

The inversion pump 51c is a device in which the fluid suction side and the fluid discharge side can be inverted. Thus, the inversion pump 51c of Embodiment 5, during both the cooling operation and the heating operation, can suck the liquid use-side heat medium, can increase the pressure thereof, and can deliver the use-side heat medium at increased pressure. The inversion pump 51c is, for example, an inverter centrifugal pump or a turbo-type non-positive displacement pump.

[Cooling Operation]

Figure 12:
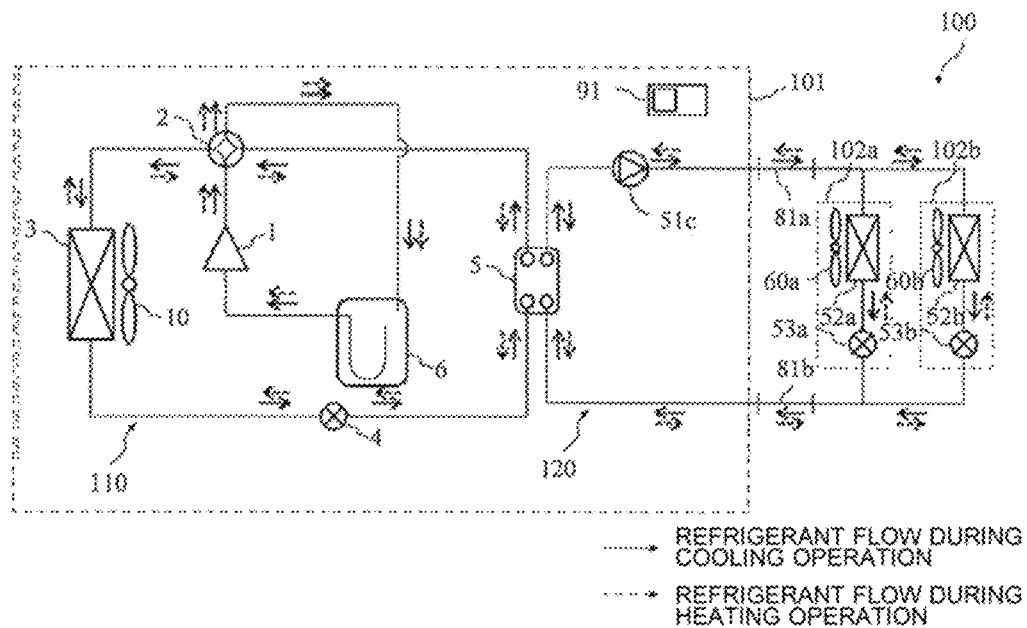
FIG. 12 illustrates heat-medium flows during a cooling operation and a heating operation of the air-conditioning apparatus according to Embodiment 5.

FIG. 12 illustrates heat-medium flows during the cooling operation and the heating operation of the air-conditioning apparatus according to Embodiment 5. The solid line and the broken line in FIG. 12 represent respectively the flow of the heat medium during the cooling operation and the flow of the heat medium during the heating operation. The flows of the heat medium, with the operation of each device, will be described here. The flows of the heat source-side heat medium in the heat source-side cycle 110 and the operations of the devices during the cooling operation and the heating operation are similar to those described in Embodiment 1.

The flow of the use-side heat medium during the cooling operation will be described. The inversion pump 51c increases the pressure of the sucked liquid use-side heat medium at medium-temperature pressure. The liquid use-side heat medium at medium-temperature pressure flows into the use-side heat exchanger 52 via the forward pipe 81a. Due to heat exchange with the indoor air supplied from the use-side fan 60, the use-side heat exchanger 52 heats the liquid use-side heat medium at medium-temperature pressure to evaporate and gasify the liquid use-side heat medium. The use-side heat medium that has been evaporated and gasified at the use-side heat exchanger 52 to turn to a medium temperature-pressure gaseous state flows into the intermediate heat exchanger 5 via the pressure-reducing device 53 and the return pipe 81b. The intermediate heat exchanger 5 causes heat exchange to be performed between the gaseous use-side heat medium at medium-temperature pressure and the heat source-side heat medium circulating in the heat source-side cycle 110. The gaseous use-side heat medium at medium-temperature pressure is cooled to be condensed and liquefied. The use-side heat medium that has been condensed and liquefied at the intermediate heat exchanger 5 to turn to a medium temperature-pressure liquid state is sucked again into the inversion pump 51c.

[Heating Operation]

Next, the flow of the use-side heat medium during the heating operation will be described. The inversion pump 51c increases the pressure of the sucked liquid use-side heat medium at medium-temperature pressure. The liquid use-side heat medium at medium-temperature pressure flows into the intermediate heat exchanger 5. The intermediate heat exchanger 5 causes heat exchange to be performed between the liquid use-side heat medium at medium-temperature pressure and the heat source-side heat medium circulating in the heat source-side cycle 110. The liquid use-side heat medium at medium-temperature pressure is heated to be evaporated and gasified. The use-side heat medium that has been evaporated and gasified at the intermediate heat exchanger 5 to turn to a medium temperature-pressure gaseous state flows into the use-side heat exchanger 52 via the return pump 81b and the pressure-reducing device 53. Due to heat exchange with the indoor air supplied from the use-side fan 60, the use-side heat exchanger 52 cools the gaseous use-side heat medium at medium-temperature pressure to condense and make the gaseous use-side heat medium into a device. The use-side heat medium that has been condensed and liquefied at the use-side heat exchanger 52a to turn to a medium temperature-pressure liquid state is sucked again into the inversion pump 51c via the forward pipe 81a.

Advantageous Effects

The air-conditioning apparatus 100 of Embodiment 5 is equipped with the inversion pump 51c in the use-side cycle 120. Thus, the air-conditioning apparatus 100 of Embodiment 5 is capable of switching between the cooling operation and the heating operation, at the inversion pump 51c, in response to an operation request from the indoor unit 102. At this time, in the air-conditioning apparatus 100 of Embodiment 5, the liquid use-side heat medium is caused to pass through the inversion pump 51c. Consequently, it is possible to avoid a breakdown of the inversion pump 51c. In addition, in the air-conditioning apparatus 100 of Embodiment 5, the use-side heat medium passing through the forward pipe 81a and the use-side heat medium passing through the return pipe 81b can be brought in the same phase state during both the cooling operation and the heating operation. Thus, the diameters of the pipes can be reduced.

Embodiment 6

Here, regarding each of the air-conditioning apparatuses 100 of Embodiments 1 to 5, the heat source-side heat medium is circulated in the heat source-side cycle 110 and, at the intermediate heat exchanger 5, exchanges heat with the use-side heat medium so that the use-side heat medium receives or transfers the heat. Here, the use-side heat medium may also be heated and cooled by using a heating device and a cooling device.

REFERENCE SIGNS LIST

1: compressor, 2: heat source-side flow-switching device, 3: heat source-side heat exchanger, 4: expansion device, 5: intermediate heat exchanger, 6: accumulator, 10: heat source-side fan, 51: pump, 51a: cooling-dedicated pump, 51b: heating-dedicated pump, 51c: inversion pump, 52, 52a, 52b: use-side heat exchanger, 53, 53a, 53b: pressure-reducing device, 54: cooling-dedicated on-off valve, 54a: cooling-dedicated first on-off valve, 54b: cooling-dedicated second on-off valve, 54c: cooling-dedicated third on-off valve, 55:

heating-dedicated on-off valve, 55*a*: heating-dedicated first on-off valve, 55*b*: heating-dedicated second on-off valve, 55*c*: heating-dedicated third on-off valve, 56: receiver, 57: decomposition-product precipitation device, 58: cooling device, 59: decomposition product, 60, 60*a*, 60*b*: use-side fan, 81*a*: forward pipe, 81*b*: return pipe, 91: controller, 92: intermediate-heat-exchanger outlet temperature sensor, 100: air-conditioning apparatus, 101: outdoor unit, 102, 102*a*, 102*b*: indoor unit, 110: heat source-side cycle, 120: use-side cycle

The invention claimed is:

1. An air-conditioning apparatus comprising:
a heat source-side system having an intermediate heat exchanger that causes heat exchange to be performed between a heat source-side heat medium and a use-side heat medium differing from the heat source-side heat medium, causes the heat source-side heat medium to receive or transfer heat due to performing switching, and causes the use-side heat medium to undergo a phase change; and
a use-side cycle circuit formed of pipes connecting, to one another, the intermediate heat exchanger, a pump that sucks and delivers the use-side heat medium in a liquid state, a use-side heat exchanger that heats or cools air in an air-conditioning target space due to heat exchange causing a change in phase of the use-side heat medium, and a pressure-reducing device that reduces a pressure of the use-side heat medium that passes through the use-side heat exchanger, the use-side cycle circuit causing the use-side heat medium to circulate through the use-side cycle circuit,
wherein the use-side cycle circuit includes
a use-side flow-switching device that performs switching of a flow of the use-side heat medium so that, during a cooling operation for cooling air in the air-conditioning target space, the pump sucks the use-side heat medium whose phase has been changed from gas to liquid at the intermediate heat exchanger and so that, during a heating operation for heating air in the air-conditioning target space, the pump sucks the use-side heat medium whose phase has been changed from gas to liquid at the use-side heat exchanger, and wherein
the use-side flow-switching device has
a cooling-dedicated first on-off valve disposed on a pipe between the intermediate heat exchanger and the pump,
a cooling-dedicated second on-off valve disposed on a pipe between the pump and the use-side heat exchanger,
a cooling-dedicated third on-off valve disposed on a pipe between the pressure-reducing device and the intermediate heat exchanger,
a heating-dedicated first on-off valve disposed on a pipe connecting a pipe between the pressure-reducing device and the cooling-dedicated third on-off valve to a pipe between the cooling-dedicated first on-off valve and the pump,
a heating-dedicated second on-off valve disposed on a pipe connecting a pipe between the pump and the cooling-dedicated second on-off valve to a pipe between the cooling-dedicated third on-off valve and the intermediate heat exchanger, and
a heating-dedicated third on-off valve disposed on a pipe connecting a pipe between the intermediate heat exchanger and the cooling-dedicated first on-off valve to a pipe between the cooling-dedicated second on-off valve and the use-side heat exchanger.

2. The air-conditioning apparatus of claim 1, further comprising
a controller configured to control the heat source-side system and a device of the use-side cycle circuit, wherein
the controller configured to perform a control so that, during the heating operation for heating air in the air-conditioning target space, the use-side heat medium in the use-side cycle circuit has a temperature and a pressure higher than a temperature and a pressure of the use-side heat medium in the use-side cycle circuit during the cooling operation for cooling air in the air-conditioning target space and so that, during the heating operation, at the intermediate heat exchanger, the use-side heat medium has an evaporating temperature higher than a condensing temperature of the use-side heat medium during the cooling operation.

3. The air-conditioning apparatus of claim 1, further comprising
a controller configured to control the heat source-side system and a device of the use-side cycle circuit, wherein
the controller is configured to
perform, during the cooling operation, a control to open the cooling-dedicated first on-off valve, the cooling-dedicated second on-off valve, and the cooling-dedicated third on-off valve and a control to close the heating-dedicated first on-off valve, the heating-dedicated second on-off valve, and the heating-dedicated third on-off valve and
perform, during the heating operation, a control to close the cooling-dedicated first on-off valve, the cooling-dedicated second on-off valve, and the cooling-dedicated third on-off valve and a control to open the heating-dedicated first on-off valve, the heating-dedicated second on-off valve, and the heating-dedicated third on-off valve.

4. The air-conditioning apparatus of claim 1, wherein
the use-side cycle circuit includes
a receiver disposed on a pipe connecting the cooling-dedicated first on-off valve to the pump and positioned between a junction with a pipe on which the heating-dedicated first on-off valve is disposed and the pump, the receiver causing the use-side heat medium in a liquid state that has been separated from the use-side heat medium in a gaseous state to pass through the receiver.

5. The air-conditioning apparatus of claim 4, further comprising
a decomposition-product precipitation device having the receiver and a cooling device that cools the use-side heat medium in the receiver.

6. The air-conditioning apparatus of claim 1, further comprising:
a controller configured to control the heat source-side system and a device of the use-side cycle circuit; and
an intermediate-heat-exchanger outlet temperature sensor that detects a temperature of the use-side heat medium that flows out from the intermediate heat exchanger, wherein
the controller is configured to control
the device so that a temperature detected by the intermediate-heat-exchanger outlet temperature sensor is lower than a set temperature determined in advance.

7. The air-conditioning apparatus of claim 6, wherein
the set temperature is set based on a temperature at which a decomposition reaction of the use-side heat medium is caused.

8. The air-conditioning apparatus of claim 1, wherein
the heat source-side system has
a heat source-side cycle circuit formed of pipes connecting, to one another, a compressor that compresses the heat source-side heat medium, a heat source-side flow-switching device that performs switching of a flow passage of the heat source-side heat medium, a heat source-side heat exchanger that causes the heat source-side heat medium to perform heat exchange, an expansion device that regulates a pressure of the heat source-side heat medium, and the intermediate heat exchanger, the heat source-side cycle circuit causing the heat source-side heat medium to circulate through the heat source-side cycle circuit.

9. The air-conditioning apparatus of claim 1, wherein
the use-side heat medium is a nonflammable refrigerant.

10. The air-conditioning apparatus of claim 1, wherein
the use-side heat medium is an R466A refrigerant, an R13I1 refrigerant, or a mixed refrigerant containing the R13I1 refrigerant.

11. The air-conditioning apparatus of claim 2, further comprising
a controller configured to control the heat source-side system and a device of the use-side cycle circuit, wherein
the controller is configured to
perform, during the cooling operation, a control to open the cooling-dedicated first on-off valve, the cooling-dedicated second on-off valve, and the cooling-dedicated third on-off valve and a control to close the heating-dedicated first on-off valve, the heating-dedicated second on-off valve, and the heating-dedicated third on-off valve and
perform, during the heating operation, a control to close the cooling-dedicated first on-off valve, the cooling-dedicated second on-off valve, and the cooling-dedicated third on-off valve and a control to open the heating-dedicated first on-off valve, the heating-dedicated second on-off valve, and the heating-dedicated third on-off valve.

12. The air-conditioning apparatus of claim 2, wherein
the use-side cycle circuit includes
a receiver disposed on a pipe connecting the cooling-dedicated first on-off valve to the pump and positioned between a junction with a pipe on which the heating-dedicated first on-off valve is disposed and the pump, the receiver causing the use-side heat medium in a liquid state that has been separated from the use-side heat medium in a gaseous state to pass through the receiver.

13. The air-conditioning apparatus of claim 3, wherein
the use-side cycle circuit includes
a receiver disposed on a pipe connecting the cooling-dedicated first on-off valve to the pump and positioned between a junction with a pipe on which the heating-dedicated first on-off valve is disposed and the pump, the receiver causing the use-side heat medium in a liquid state that has been separated from the use-side heat medium in a gaseous state to pass through the receiver.

* * * * *